(12) United States Patent
Mori et al.

(10) Patent No.: US 10,610,891 B2
(45) Date of Patent: *Apr. 7, 2020

(54) VIBRATION MOTOR INCLUDING BACK YOKE WITH PROTRUSION PORTIONS

(71) Applicant: Nidec Seimitsu Corporation, Ueda-shi, Nagano-ken (JP)

(72) Inventors: Zendi Mori, Ueda (JP); Mitsuru Murata, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 141 days.

This patent is subject to a terminal disclaimer.

(21) Appl. No.: 15/693,573

(22) Filed: Sep. 1, 2017

(65) Prior Publication Data

US 2018/0071776 A1  Mar. 15, 2018

Related U.S. Application Data

(60) Provisional application No. 62/394,300, filed on Sep. 14, 2016.

(30) Foreign Application Priority Data

Sep. 30, 2016  (JP) .................. 2016-193228

(51) Int. Cl.
*B06B 1/04* (2006.01)
*H02K 33/00* (2006.01)
*H02K 1/12* (2006.01)
*H02K 3/50* (2006.01)

(52) U.S. Cl.
CPC ............... *B06B 1/045* (2013.01); *H02K 1/12* (2013.01); *H02K 3/50* (2013.01); *H02K 33/00* (2013.01)

(58) Field of Classification Search
CPC . B06B 1/045; H02K 1/12; H02K 3/50; H02K 33/00
See application file for complete search history.

(56) References Cited

U.S. PATENT DOCUMENTS 8,669,679 B2    3/2014   Lee et al.
8,803,373 B2 *  8/2014   Choi ................. H02K 33/18
                                              310/25

(Continued)

FOREIGN PATENT DOCUMENTS

JP    2013-085438 A    5/2013

OTHER PUBLICATIONS

Mori et al., "Vibration Motor", U.S. Appl. No. 15/693,589, filed Sep. 1, 2017.

(Continued)

*Primary Examiner* — Emily P Pham
(74) *Attorney, Agent, or Firm* — Keating & Bennett

(57) ABSTRACT

A back yoke of a vibration motor has a rectangular top surface portion, a long side protrusion portion that protrudes downward from a long side portion of the top surface portion, and a short side protrusion portion that protrudes downward from a short side portion of the top surface portion. The short side protrusion portion has a protrusion amount smaller than that of the long side protrusion portion. A portion of a lead wire extending from the short side of a coil is disposed below the short side protrusion portion.

16 Claims, 12 Drawing Sheets

(56) References Cited

U.S. PATENT DOCUMENTS 9,473,008 B2 * 10/2016 Hong .................... H02K 33/18
10,141,826 B2 * 11/2018 Kim ...................... H02K 33/18

OTHER PUBLICATIONS

Mori et al., "Vibration Motor", U.S. Appl. No. 15/693,578, filed Sep. 1, 2017.
Mori et al., "Vibration Motor", U.S. Appl. No. 15/702,825, filed Sep. 13, 2017.
Mori et al., "Vibration Motor", U.S. Appl. No. 15/704,133, filed Sep. 14, 2017.

* cited by examiner

VIBRATION MOTOR INCLUDING BACK YOKE WITH PROTRUSION PORTIONS

CROSS REFERENCE TO RELATED APPLICATIONS

This application claims the benefit of priority to U.S. Patent Application No. 62/394,300 filed on Sep. 14, 2016 and Japanese Patent Application No. 2016-193228 filed on Sep. 30, 2016. The entire contents of these applications are hereby incorporated herein by reference.

BACKGROUND OF THE INVENTION

1. Field of the Invention

The present invention relates to a vibration motor.

2. Description of the Related Art

In the related art, various devices such as a smartphone and the like are provided with a vibration motor. Among vibration motors, there are a type of vibration motor that performs linear vibration in a horizontal direction and a type of vibration motor that performs linear vibration in a longitudinal direction. A human being who is a user is more likely to sense vibration in the longitudinal direction than vibration in the horizontal direction. An example of a longitudinal linear vibration type of vibration motor in the related art is described in Japanese Unexamined Patent Application Publication No. 2013-85438.

The vibration motor described in Japanese Unexamined Patent Application Publication No. 2013-85438 includes a fixed portion, a magnetic field portion, a substrate, a vibration portion, and an elastic member. The fixed portion has a case with a lower portion that is open and a bracket for sealing an internal space of the case. The magnetic field portion has a magnet fixed on the bracket and a yoke plate fixed on the magnet. The vibration portion has a coil and a mass body. The substrate is fixed to the lower surface of the coil. The elastic member is disposed between the case and the vibration portion. The coil has an inner diameter that is larger than an outer diameter of the opposing magnet, and a portion of the magnet can be inserted into the space formed by the coil.

When the coil is energized via the substrate, the vibration portion vibrates in the longitudinal direction due to the interaction between the magnetic field generated in the coil and the magnetic field formed by the magnet.

In smartphones, wearable devices, and the like in which vibration motors are mounted, a larger battery tends to be mounted in order to realize long time driving and thus the degree of freedom with respect to the disposition location and disposition volume of the vibration motor is small.

SUMMARY OF THE INVENTION

In an exemplary embodiment of the invention, there is provided a vibration motor including: a stationary portion which has a base plate, a substrate, a coil, and a case; a vibrating body which has a magnet, a back yoke, and a weight and is supported by the stationary portion so as to be capable of vibrating in a vertical direction; and an elastic member.

The substrate is disposed on the base plate, the coil is disposed on the substrate, and the magnet is disposed so as to be accommodated on an inner peripheral side of the coil having an annular shape by vibration.

The back yoke is disposed on the magnet, the weight is disposed on the back yoke, and the case accommodates the coil, the magnet, the back yoke, and the weight.

The elastic member is disposed between the case and the weight.

The back yoke has a rectangular top surface portion, a long side protrusion portion that protrudes downward from a long side portion of the top surface portion, and a short side protrusion portion that protrudes downward from a short side portion of the top surface portion.

The short side protrusion portion has a protrusion amount smaller than that of the long side protrusion portion.

A portion of a lead wire extending from the short side of the coil is disposed below the short side protrusion portion.

According to an exemplary embodiment of the present application, it is possible to provide a vibration motor of a longitudinal linear vibration type which can be advantageously disposed in a limited space in a device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, an exemplary embodiment of the invention will be described with reference to the drawings. In the following drawings, a vibration direction of the vibrating body is a vertical direction and is expressed as an X-direction. In addition, a first direction which is a direction orthogonal to the vertical direction is expressed as a Y-direction. In addition, a second direction which is a direction orthogonal to the vertical direction and the first direction is expressed as a Z-direction. However, the definitions of these directions do not represent the positional relationships and directions when the vibrating body is incorporated into an actual device.

<1. Overall Configuration of Vibration Motor>

Figure 1:
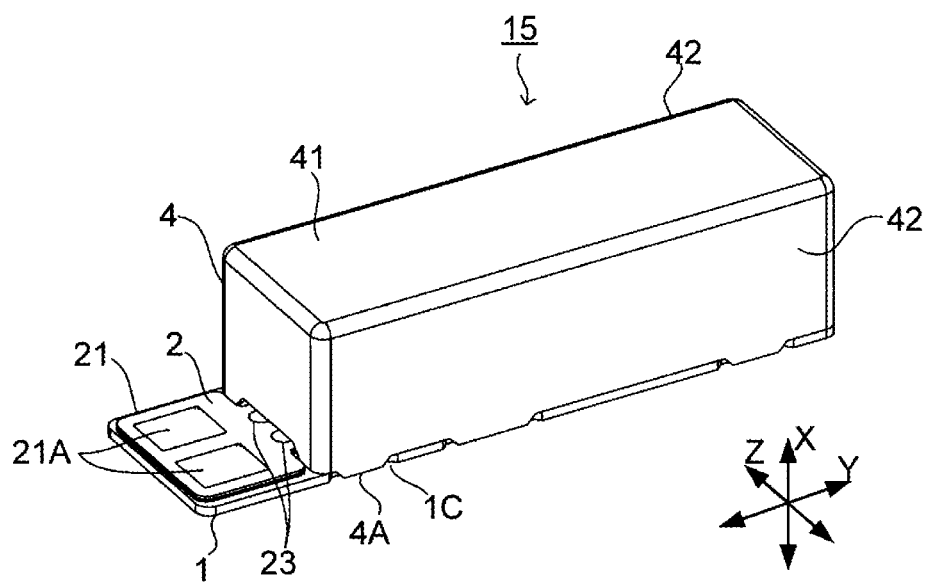
FIG. 1 is an overall perspective view of a vibration motor according to an embodiment of the invention as viewed from above.
Figure 2:
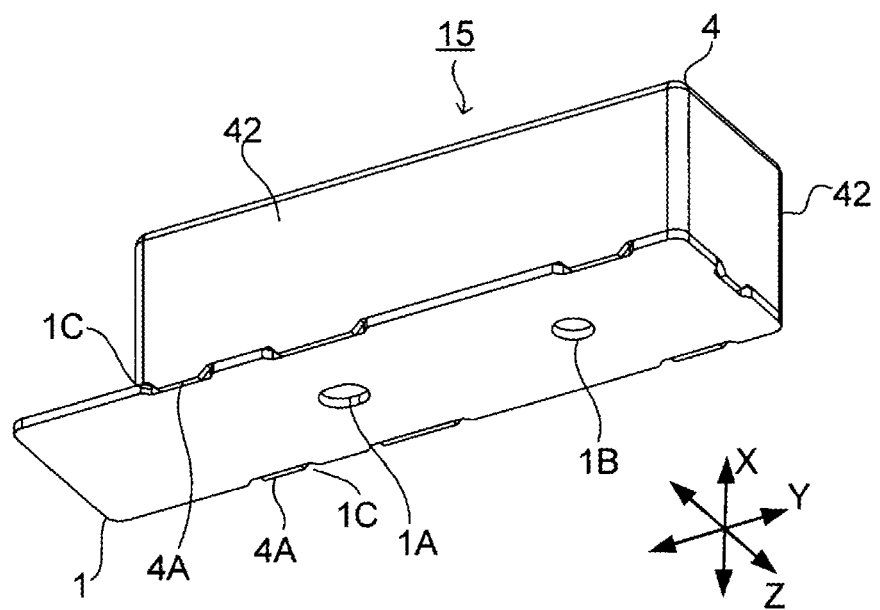
FIG. 2 is an overall perspective view of the vibration motor according to the embodiment of the invention as viewed from below.
Figure 3:
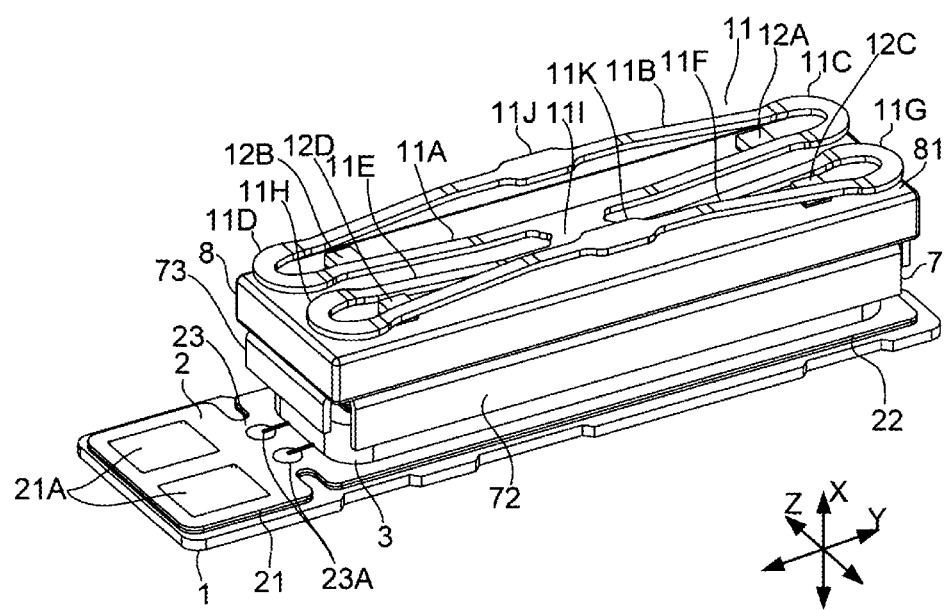
FIG. 3 is a perspective view illustrating a state where a case is removed from the vibration motor illustrated in FIG. 1.
Figure 4:
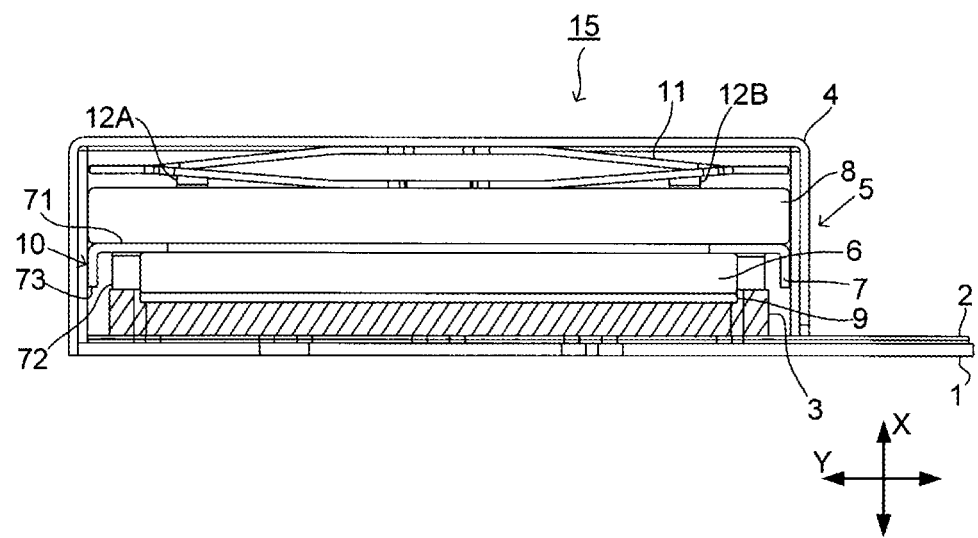
FIG. 4 is a side sectional view of the vibration motor according to the embodiment of the invention.

First, the overall configuration of a vibration motor according to one embodiment of the invention will be described with reference to FIGS. 1 to 4. FIG. 1 is an overall perspective view of a vibration motor 15 according to an embodiment of the invention as viewed from above. FIG. 2 is an overall perspective view of the vibration motor 15 as viewed from below. FIG. 3 is a perspective view illustrating a state where a case 4 has been removed from the vibration motor 15 illustrated in FIG. 1. FIG. 4 is a side sectional view of the vibration motor 15.

The vibration motor 15 according to the present embodiment roughly includes a stationary portion 5, a vibrating body 10, and an elastic member 11.

The stationary portion 5 has a base plate 1, a substrate 2, a coil 3, and a case 4. The base plate 1 is, for example, a metal plate-like member. The base plate 1 is formed in a rectangular shape having long sides that extend in the first direction and short sides that extend in the second direction in a top view.

The substrate 2 is disposed on the base plate 1 and is formed of a flexible printed circuit board (FPC). The substrate 2 may be formed of a rigid substrate. The substrate 2 has a first substrate portion 21, a second substrate portion 22, and a connection portion 23. The first substrate portion 21, the connection portion 23, and the second substrate portion 22 are arranged in this order in the first direction. The width of the first substrate portion 21 in the first direction is smaller than the width of the second substrate portion 22 in the first direction. The widths of the first substrate portion 21 and the second substrate portion 22 in the second direction are identical to each other and are larger than the width of the connection portion 23 in the second direction.

Two first terminal portions 21A are formed on the first substrate portion 21 side by side in the second direction and are exposed at an upper surface side thereof. Two second terminal portions 23A are formed on the connection portion 23 side by side in the second direction and are exposed at the upper surface side thereof. The first terminal portions 21A and the second terminal portions 23A that are adjacent to each other in the first direction are connected to each other by wiring of the substrate 2 and are electrically connected to each other.

The coil 3 is disposed on the second substrate portion 22 of the substrate 2. In a top view, the coil 3 is formed in an annular shape having long sides that extend in the first direction and short sides that extend in the second direction. A lead wire that extends from the coil 3 is connected to the second terminal portion 23A. Accordingly, a current can flow through the coil 3 by applying a voltage to the first terminal portion 21A from the outside.

The case 4 is a rectangular-parallelepiped-shaped cover member having a rectangular shape with long sides that extend in the first direction and short sides that extend in the second direction in a top view, and whose lower surface is open. The coil 3, the vibrating body 10, and the elastic member 11 are accommodated in the internal space of the case 4.

The vibrating body 10 has a magnet 6, a back yoke 7, a weight 8, and a pole piece 9. The magnet 6 is a rectangular parallelepiped member having a rectangular shape having long sides that extend in the first direction and short sides that extend in the second direction in a top view.

The back yoke 7 is disposed on the magnet 6 and is formed of a magnetic body. The back yoke 7 has a top surface portion 71, two long side protrusion portions 72, and two short side protrusion portions 73. The top surface portion 71 has a rectangular shape having long sides that extend in the first direction and short sides that extend in the second direction in a top view. The long side protrusion portions 72 protrude downward from long side portions of the top surface portion 71 that face each other in the second direction. The short side protrusion portions 73 protrude downward from short side portions of the top surface portion 71 that face each other in the first direction.

The weight 8 is disposed on the back yoke 7 and is formed of, for example, a tungsten alloy. In a top view, the weight 8 is a rectangular parallelepiped member having a rectangular shape having long sides that extend in the first direction and short sides that extend in the second direction.

The pole piece 9 is disposed on the lower surface of the magnet 6 and is a plate-like member formed of a magnetic body. The pole piece 9 has a rectangular shape having long sides that extend in the first direction and short sides that extend in the second direction in a top view. A magnetic path is formed by the magnet 6, the back yoke 7, and the pole piece 9.

One end side of the elastic member 11 is fixed to a lower surface of the top surface portion 41 of the case 4 and the other end side thereof is fixed to an upper surface 81 of the weight 8. In other words, the elastic member 11 is disposed between the case and the weight 8. Accordingly, the vibrating body 10 is supported so as to be capable of vibrating in the vertical direction with respect to the stationary portion 5.

The magnet 6 and the pole piece 9 are accommodated in an inner peripheral space of the coil 3 depending on the position at the time of vibration. In other words, the magnet 6 is disposed so as to be capable of being accommodated on the inner peripheral side of the annular coil 3 by the vibration.

The vibrating body 10 vibrates in the vertical direction due to a current flowing through the coil 3 when a voltage is applied from the outside to the first terminal portion 21A of the substrate 2 and an interaction between the magnetic field generated in the coil 3 and the magnetic field formed by the magnet 6, the back yoke 7, and the pole piece 9. Therefore, the vibration motor 15 is of the longitudinal linear vibration type.

As described above, the base plate 1, the case 4, the magnet 6, the back yoke 7, and the weight 8 each have a rectangular shape having long sides that extend in the first direction and short sides that extend in the second direction in a top view. Accordingly, it is possible to dispose the longitudinal linear-vibration-type vibration motor 15 in a rectangular dead space such as at the side of a battery in a device such as a smartphone or a wearable device.

<2. Configuration of Elastic Member>

Figure 5:
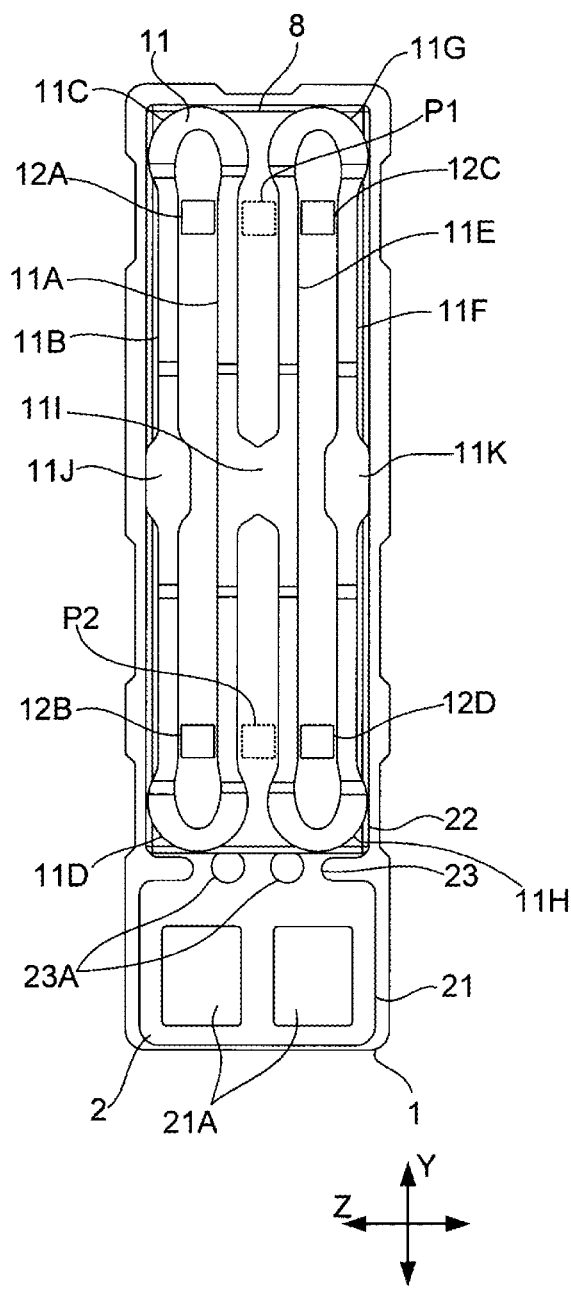
FIG. 5 is a top view illustrating a state where the case is removed from the vibration motor according to the embodiment of the invention.

Next, a more specific configuration of the elastic member 11 will be described with reference to FIG. 5. FIG. 5 is a top view illustrating a state where the case 4 is removed from the vibration motor 15.

As illustrated in FIG. 5, the elastic member 11 includes a first extension portion 11A, a second extension portion 11B, a first connection portion 11C, a second connection portion 11D, a third extension portion 11E, a fourth extension portion 11F, a third connection portion 11G, a fourth connection portion 11H, and a fifth connection portion 11I, and these portions are formed as one piece.

The first extension portion 11A and the second extension portion 11B extend in the first direction and are adjacent to each other in the second direction in a top view. The first connection portion 11C connects one end portion of the first extension portion 11A and one end portion of the second extension portion 11B to each other. The second connection portion 11D connects the other end portion of the first extension portion 11A and the other end portion of the second extension portion 11B to each other.

The third extension portion 11E extends in the first direction and faces the first extension portion 11A in the second direction. The fourth extension portion 11F extends in the first direction and is adjacent to the third extension portion 11E in the second direction in a top view. The third connection portion 11G connects one end portion of the third extension portion 11E and one end portion of the fourth extension portion 11F to each other. The fourth connection portion 11H connects the other end portion of the third extension portion 11E and the other end portion of the fourth extension portion 11F to each other.

The fifth connection portion 11I connects the center portion of the first extension portion 11A and the center portion of the third extension portion 11E to each other in the second direction.

With such a configuration, only one elastic member 11 is needed and thus the number of parts can be reduced.

Further, when the configuration of the elastic member 11 is described with reference to FIG. 3, the first extension portion 11A is inclined upward from the center portion toward both the end portions thereof. The second extension portion 11B is inclined upward from both the end portions toward the center portion thereof. The second extension portion 11B has a welded portion 11J at the uppermost place of the inclination. In addition, the third extension portion 11E is inclined upward from the center portion toward both the end portions thereof. The fourth extension portion 11F is inclined upward from both the end portions toward the center portion thereof. The fourth extension portion 11F has a welded portion 11K at the uppermost place of the inclination.

With such a configuration, the vibrating body 10 can be supported to the case 4 so as to be capable of vibrating by the fifth connection portion 11I being fixed to the upper surface 81 of the weight 8 by welding and the welded portions 11J and 11K positioned above the fifth connection portion 11I being fixed to the lower surface of the top surface portion 41 of the case 4 by welding.

Figure 6:
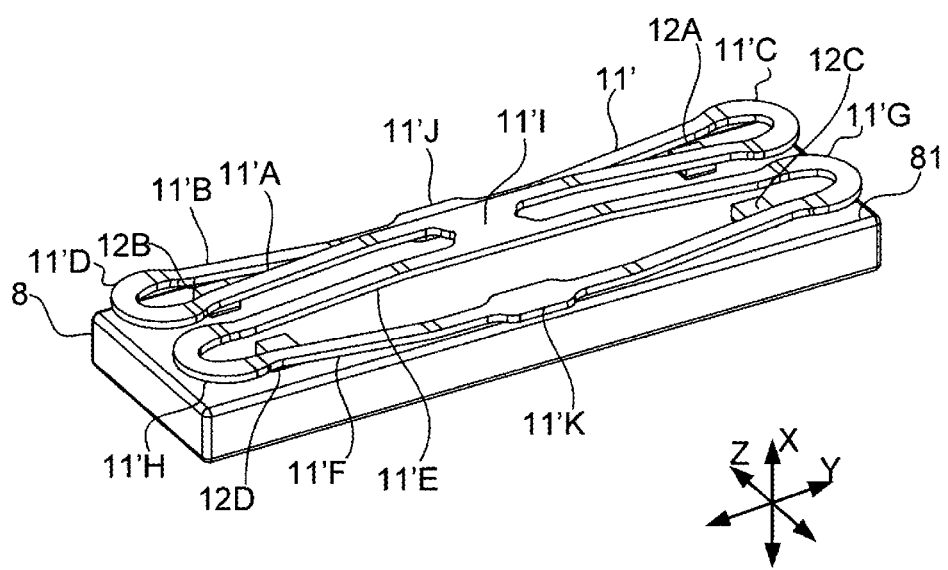
FIG. 6 is a perspective view illustrating a configuration including a modification example of an elastic member.

As a modification example of the elastic member, an elastic member 11' configured as illustrated in FIG. 6 may be used. In the elastic member 11', the first extension portion 11'A is inclined downward from the center portion toward both end portions thereof. The second extension portion 11'B is inclined downward from both end portions toward the center portion thereof. The second extension portion 11'B has a welded portion 11'J at the lowermost place of the inclination. In addition, the third extension portion 11'E is inclined downward from the center portion toward both end portions thereof. The fourth extension portion 11'F is inclined downward from both end portions toward the center portion thereof. The fourth extension portion 11'F has a welded portion 11'K at the lowermost place of the inclination.

With such a configuration, the vibrating body 10 can be supported to the case 4 so as to be capable of vibrating by the welded portions 11'J and 11'K being fixed to the upper surface 81 of the weight 8 by welding and the fifth connection portion 11'I positioned above the welded portions 11'J and 11'K being fixed to the lower surface of the top surface portion 41 of the case 4 by welding.

In addition, in the elastic member 11 (FIG. 5), the widths of the first connection portion 11C, the second connection portion 11D, the third connection portion 11G, and the fourth connection portion 11H are wider than the widths of the first extension portion 11A, the second extension portion 11B, the third extension portion 11E, and the fourth extension portion 11F. Accordingly, it is possible to disperse the stress applied to the elastic member 11 when the vibrating body 10 vibrates. This also applies to the elastic member 11' as a modification example.

<3. Disposition Configuration of Damper Member>

As illustrated in FIG. 3 and FIG. 5, the vibration motor 15 according to the present embodiment further includes damper members 12A to 12D on the upper surface 81 of the weight 8. In a top view, the damper members 12A and 12B, that is, at least one damper member is disposed in a region surrounded by the first extension portion 11A, the second extension portion 11B, the first connection portion 11C, and the second connection portion 11D. The damper members 12A and 12B are disposed at positions separated from each other in the first direction from the center portion of the region described above, respectively.

In addition, in a top view, the damper members 12C and 12D, that is, the at least one damper member is disposed in a region surrounded by the third extension portion 11E, the fourth extension portion 11F, the third connection portion 11G, and the fourth connection portion 11H. The damper members 12C and 12D are disposed at positions separated from each other in the first direction from the center portion of the region described above, respectively.

By providing such damper members 12A to 12D, when the vibration motor 15 is accidentally dropped or the like, it is possible to suppress the noise generated by the weight 8 excessively moving upward and the elastic member 11 (fifth connection portion 11I and the like) coming into contact with the lower surface of the top surface portion 41 of the case 4.

In addition, since the damper members 12A to 12D can be disposed inside the region where the elastic member 11 is disposed, the disposition space thereof can be omitted.

As illustrated in FIG. 5, for example, the damper members can be disposed at a place P1 interposed between the damper members 12A and 12C in the second direction and a place P2 interposed between the damper members 12B and 12D in the second direction. In other words, at least one damper member may be disposed in a region interposed between the first extension portion 11A and the third extension portion 11E. In this case, it may be disposed together with the damper members 12A to 12D or may be disposed only at the places P1 and P2. Even with such a configuration, it is possible to achieve the same effect as the effect described above.

In other words, the configuration relating to the damper members described above can be said as a configuration that at least one damper member is disposed in an area occupied by the elastic member 11 in a top view. Accordingly, it is possible to save the disposition space for the damper members.

Figure 7:
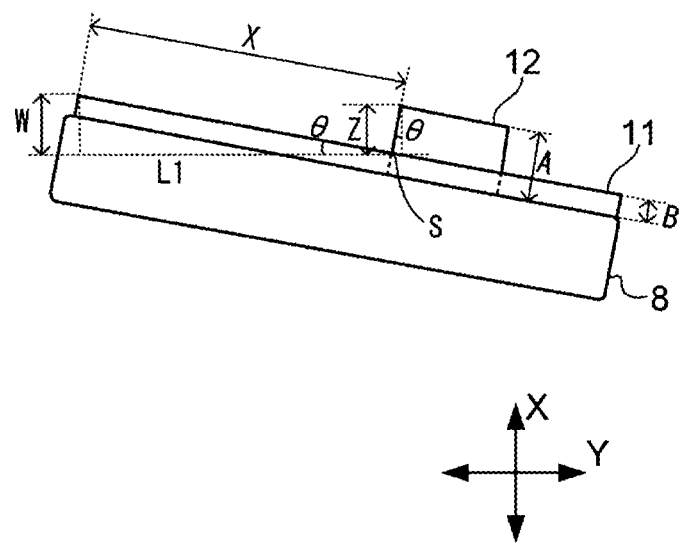
FIG. 7 is a schematic view for illustrating an appropriate position of a damper member.

Next, an appropriate position of the damper member will be described with reference to FIG. 7. FIG. 7 is a schematic view illustrating the weight 8, the elastic member 11, and the damper member 12 as viewed from a side and illustrates a state where each of these configurations (that is, the vibrating body 10) is inclined clockwise by an angle θ from the first direction.

When a height in the vertical direction from a line L1 extending and penetrating an intersection point S in the first direction where the side interposed between the upper side and the lower side of the damper member 12 intersects the upper side of the elastic member to one end portion of the upper side of the elastic member 11 is referred to as W, W is expressed by the following equation (1).

$$W = X \sin \theta \qquad (1)$$

Where, X: the distance from one end portion of the upper side of the elastic member 11 to the intersection point S.

In addition, when the height in the vertical direction from the line L1 to one end portion of the upper side of the damper member 12 is referred to as Z, Z is expressed by the following equation (2).

$$Z = (A-B)\cos \theta \qquad (2)$$

Where, A: the thickness of the damper member 12, B: the thickness of the elastic member 11.

When a condition is W<Z, the case 4 (not illustrated in FIG. 7) and the elastic member 11 is not in contact with each other. Therefore, the condition becomes X sin θ<(A−B)cos θ, which can be rewritten as the following expression (3).

$$X < (A-B)\cos \theta / \sin \theta \qquad (3)$$

Therefore, when the damper member 12 is disposed at a position represented by X that satisfies the condition of the expression (3), the case 4 and the elastic member 11 are not in contact with each other. For example, in a case of A: 0.25 mm, B: 0.12 mm, θ: 3°, X<2.4 mm.

<4. About Configuration Regarding Back Yoke>

Figure 8:
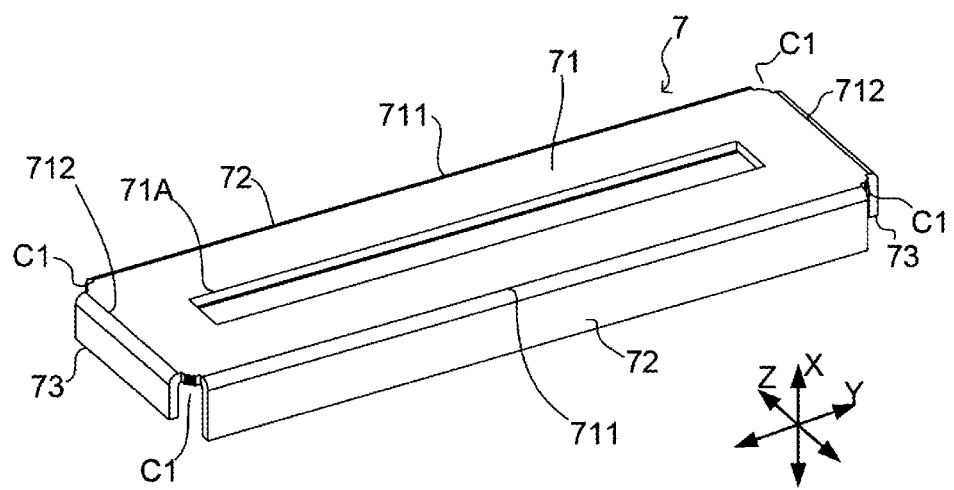
FIG. 8 is an overall perspective view of a back yoke.
Figure 9:
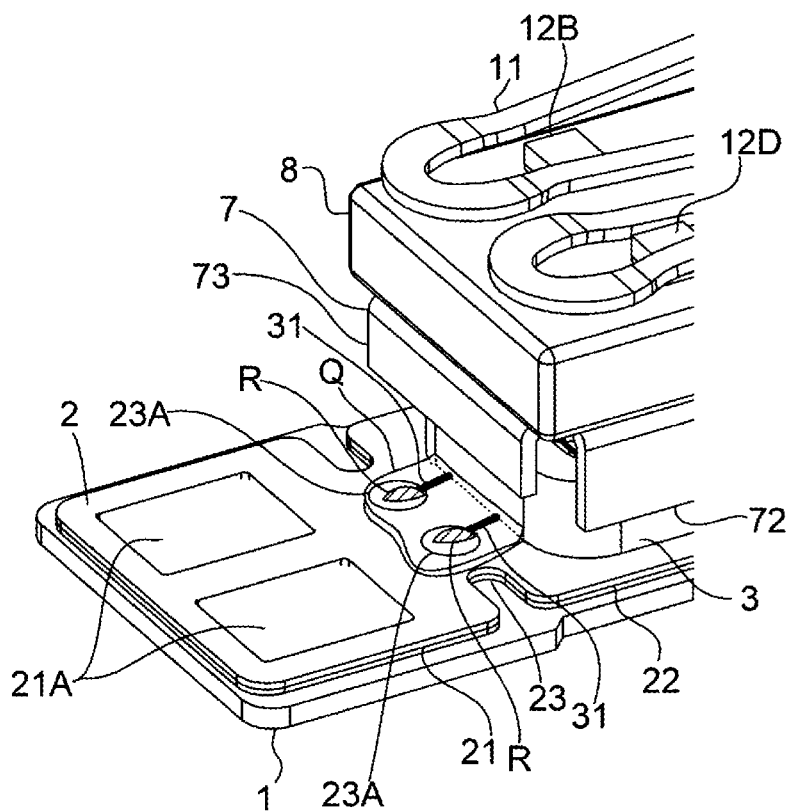
FIG. 9 is a partially enlarged perspective view illustrating a state in which the case is removed from the vibration motor according to the embodiment of the invention.
Figure 9:
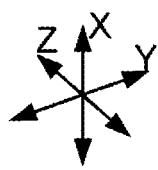

Next, the configuration regarding the back yoke 7 will be described with reference to FIGS. 8 and 9. FIG. 8 is an overall perspective view of a back yoke 7. FIG. 9 is a partially enlarged perspective view illustrating a state in which the case 4 is removed from the vibration motor 15. FIG. 9 illustrates a configuration of the periphery of the first substrate portion 21 of the substrate 2.

As illustrated in FIG. 8, the back yoke 7 has a rectangular top surface portion 71, two long side protrusion portions 72, and two short side protrusion portions 73 and these portions are formed as one piece. The long side protrusion portion 72 protrudes downward from each long side portion 711 of the top surface portion 71. The short side protrusion portion 73 protrudes downward from each short side portion 712 of the top surface portion 71. The top surface portion 71 has notch portions C1 at four corners. Therefore, when the back yoke 7 is formed from a plate material, when the long side protrusion portion 72 and the short side protrusion portion 73 are formed by being bent from the top surface portion 71, the long side protrusion portion 72 and the short side protrusion portion 73 do not come in contact with each other.

In addition, as illustrated in FIG. 9, an end portion of the lead wire 31 taken out from the short side of the coil 3 in the first direction is connected and fixed to the each second terminal portion 23A provided at the connection portion 23 of the substrate 2 by a solder fixing portion R. The end portion of the lead wire 31 to be fixed is disposed below the short side protrusion portion 73 of the back yoke 7. In other words, a portion of the lead wire 31 is disposed below the short side protrusion portion 73.

Here, the short side protrusion portion 73 has a protrusion amount smaller than that of the long side protrusion portion 72. Therefore, even if the lead wire 31 is taken out from the short side of the coil 3, disconnection of the lead wire 31 can be suppressed and space saving is achieved.

In addition, the solder fixing portion R is disposed below the short side protrusion portion 73. In other words, below the short side protrusion portion 73, a solder fixing portion R to which a portion of the lead wire 31 is fixed to the substrate 2 is disposed. This makes it possible to prevent the back yoke 7 from coming into contact with the solder fixing portion R and from destroying the solder fixing portion R during normal vibration of the vibrating body 10.

In addition, in order to suppress disconnection of the lead wire 31, an adhesive Q is provided so as to cover the lead wire 31 and the solder fixing portion R. The adhesive Q contacts the short side of the coil 3. The adhesive Q is disposed below the short side protrusion portion 73. Therefore, when the vibrating body 10 vibrates normally, the back yoke 7 comes into contact with the adhesive Q, and thus it is possible to suppress the generation of noise.

In addition, a penetration hole 71A penetrating through the top surface portion 71 of the back yoke 7 in the vertical direction is provided therein. In other words, a penetration hole 71A is provided on the surface of the back yoke 7 to which the magnet 6 is fixed.

Accordingly, for example, in a state where the magnet 6 is fixed to the top surface portion 71 by a magnetic force, when where the magnet 6 is fixed to the top surface portion 71 by pouring the adhesive into the penetration hole 71A, the protrusion of the adhesive to the outside of the magnet 6 can be suppressed.

In addition, for example, in a state where the adhesive is applied in advance to the peripheral region of the penetration hole 71A or a surface of the magnet 6 corresponding to the peripheral region thereof, even in a case of method in which the magnet 6 and the top surface portion 71 are brought into contact with each other and then the magnet 6 is fixed to the top surface portion 71, since a portion of the adhesive flows into an inside portion of the penetration hole 71A, the protrusion of the adhesive to the outside of the magnet 6 can be suppressed. In other words, the adhesive can escape to the penetration hole 71A.

In addition, for example, like the magnet 6, in a state where the adhesive is applied in advance to the peripheral region of the penetration hole 71A or the surface of the weight 8 corresponding to the peripheral region of the penetration hole 71A, even in a case of method in which the weight 8 and the top surface portion 71 come into contact with each other and the weight 8 is fixed to the top surface portion 71, a portion of the adhesive can escape into the inside portion of the penetration hole 71A and the protrusion of the adhesive to the outside of the weight 8 can be suppressed.

<5. About Constitution of Substrate>

Figure 10:
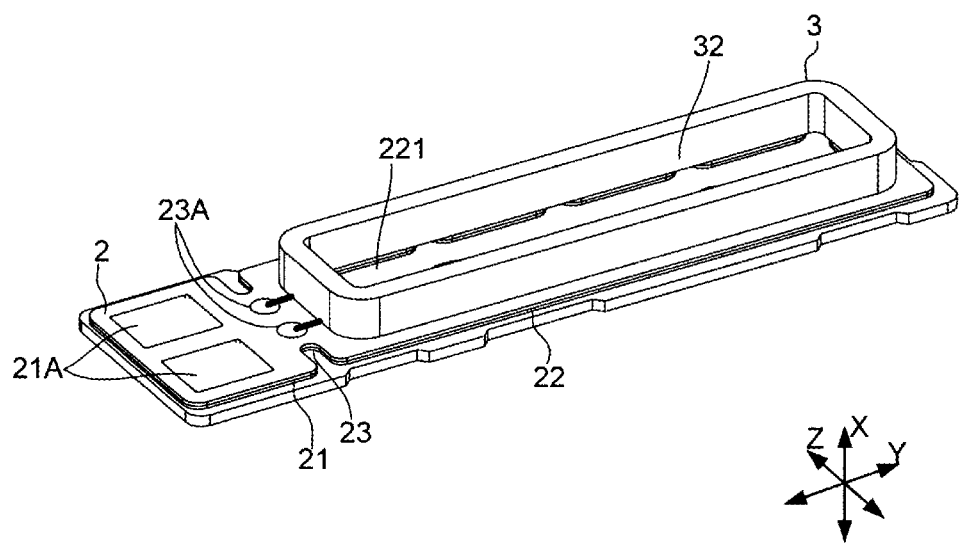
FIG. 10 is a perspective view illustrating a configuration in which a substrate and a coil are disposed on a base plate.
Figure 11:
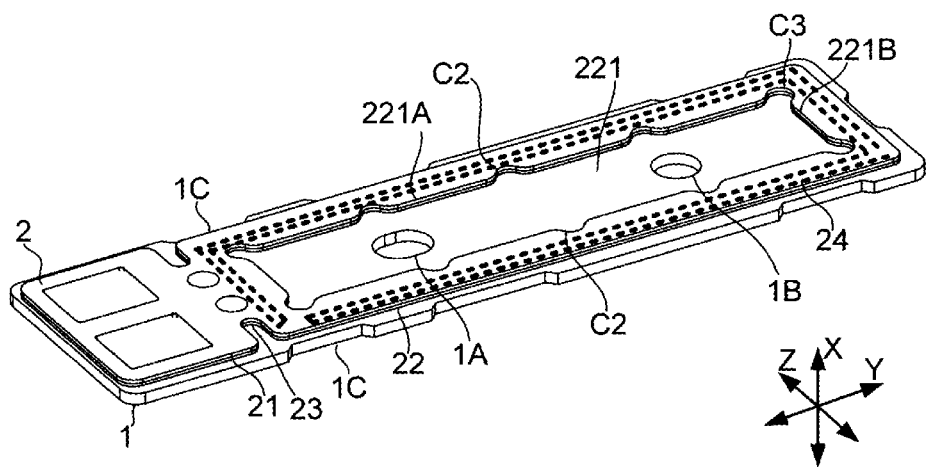
FIG. 11 is a perspective view illustrating a configuration in which a substrate is disposed on a base plate.

Next, a more specific configuration of the substrate 2 will be described with reference to FIG. 10 and FIG. 11. FIG. 10 is a perspective view illustrating a configuration in which a substrate 2 and a coil 3 are disposed on a base plate 1 of the vibration motor 15. FIG. 11 is a perspective view illustrating a configuration in which a substrate 2 is disposed on a base plate 1 of the vibration motor 15. In other words, FIG. 11 illustrates the state in which the coil 3 is omitted from a state of FIG. 10.

The coil 3 has an internal space 32 on the inner peripheral side thereof. A penetration region 221 penetrating in the vertical direction is formed on the second substrate portion 22 of the substrate 2. In the top view, an edge portion of the internal space 32 overlaps a straight line portion at the edge portion of the penetration region 221. In other words, the substrate 2 has the penetration region 221 penetrating at least on the inner peripheral side of the coil 3 in the vertical direction. Accordingly, a stroke of the vibrating body 10 can be increased. The edge portion of the penetration region 221 may be disposed on the inner peripheral side or the outer peripheral side from the edge portion of the internal space 32.

In addition, the edge portion of the penetration region 221 includes a long side edge portion 221A facing in the first direction and a short side edge portion 221B facing in the second direction. Three notch portions C2 recessed toward the outer peripheral side thereof are formed in each long side edge portion 221A. Further, a notch portion C3 recessed toward the outer peripheral side thereof is formed on four corners of the edge portion of the penetration region 221, that is, on a place where the long side edge portion 221A and the short side edge portion 221B are close to each other. In other words, a plurality of notch portions are provided at the edge portion of the penetration region 221.

When the coil 3 is fixed to the base plate 1, an adhesive is applied to each of the notch portions C2 and C3. While the second substrate portion 22 is interposed between the coil 3 and the base plate 1, the coil 3 can be fixed to the base plate 1 by the coil 3 being pressed against the second substrate portion 22 from above each of the notch portions C2 and C3. Therefore, peeling of the substrate 2 from the base plate 1 can be suppressed.

In addition, in the second substrate portion 22, a closed path pattern 24 is provided on the periphery of the penetration region 221. The closed path pattern 24 is a closed wiring pattern (for example, a copper foil pattern) and no current flows. In addition, the closed path pattern 24 is formed on the inside portion of the substrate 2 in FIG. 11, but may be exposed on the upper surface of the substrate 2. In addition, the closed path pattern 24 in FIG. 11 has a shape in which both end portions thereof are not connected to each other, but may be a pattern in which both end portions are connected to each other, that is, may be an annular pattern. Alternatively, the closed path pattern 24 may be a straight line pattern which is divided corresponding to each side of the edge portion of the penetration region 221.

This makes it possible to reinforce the strength of the second substrate portion 22 of which strength is weakened by providing the penetration region 221, by the closed path pattern 24.

<6. About Configuration of Base Plate>

Next, a more specific configuration of the base plate 1 will be described. As illustrated in FIG. 11, in the region in the penetration region 221 of the base plate 1, two hole portions 1A and 1B penetrating vertically with different shapes from each other are provided. The hole portions 1A and 1B are arranged in the first direction.

Figure 12:
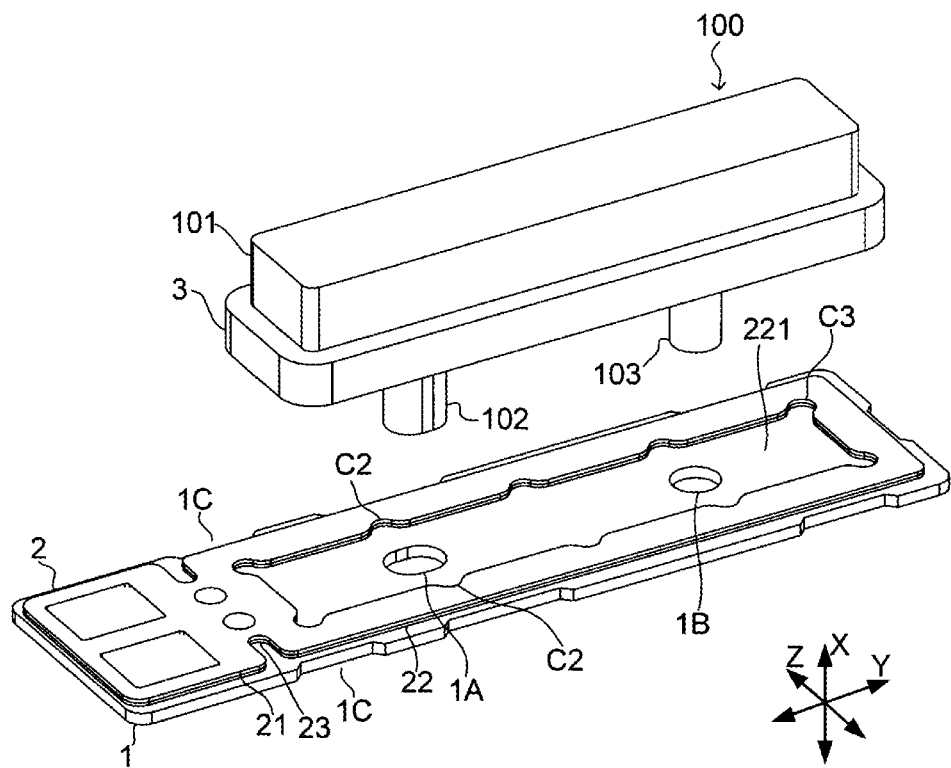
FIG. 12 is a perspective view for illustrating fixation of the coil by a jig.

The hole portions 1A and 1B are used when the coil 3 is fixed to the substrate 2. As illustrated in FIG. 12, when the coil 3 is fixed to the substrate 2, a jig (bobbin) 100 is used. The jig 100 has a base portion 101 and bosses 102 and 103 protruding downward from the base portion 101. The boss 102 has a cross-sectional shape corresponding to the hole portion 1A and the boss 103 has a cross-sectional shape corresponding to the hole portion 1B.

The boss 102 of the jig 100 in a state where a coil 3 is wound around the base portion 101 is penetrated through the hole portion 1A, the boss 103 is penetrated through the hole portion 1B, and thus the coil 3 is disposed on the substrate 2. At this time, as described above, since the adhesive is applied to each of the notch portions C2 and C3 of the substrate 2, the coil 3 is fixed to the base plate 1. Thereafter, the jig 100 is removed from the coil 3.

Since the hole portions 1A and 1B have shapes different from each other, it is possible to easily align the jigs 100 in the fixing operation of the coil 3.

In addition, as illustrated in FIG. 11 and the like, a recessed notch portion 1C is provided in each side portion of the base plate 1 facing in the second direction. In the example of FIG. 11, three recessed notch portions 1C are provided side by side in the first direction for each side portion.

On the other hand, as illustrated in FIG. 1 and FIG. 2, the case 4 has side surface portions 42 that face in the second direction. Each of the side surface portions 42 has a projection portion 4A protruding downward. Three projection portions 4A are provided side by side in the first direction for each side surface portion 42.

Each projection portion 4A is fitted into the corresponding recessed notch portion 1C. Accordingly, when the case 4 is fixed to the base plate 1, the case 4 is likely to be aligned.

<7. Other>

Hereinafter, although embodiments of the invention are described, within the scope of the spirit of the present invention, various modifications of the embodiment are possible.

For example, the elastic member is not limited to the elastic member 11 described above, and may be a plurality of leaf springs disposed side by side on the weight 8 or a wound spring.

The invention can be used for a vibration motor provided in, for example, a smartphone, a wearable device, or the like.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor comprising:
   a stationary portion which has a base plate, a substrate, a coil, and a case;
   a vibrating body which has a magnet, a back yoke, and a weight and is supported by the stationary portion so as to be capable of vibrating in a vertical direction; and
   an elastic member;
   wherein the substrate is disposed on the base plate,
   the coil is disposed on the substrate,
   the magnet is disposed so as to be accommodated on an inner peripheral side of the coil having an annular shape by vibration,
   the back yoke is disposed on the magnet,
   the weight is disposed on the back yoke,
   the case accommodates the coil, the magnet, the back yoke, and the weight,
   the elastic member is disposed between the case and the weight,
   the back yoke has a rectangular top surface portion, a long side protrusion portion that protrudes downward from a long side portion of the rectangular top surface portion, and a short side protrusion portion that protrudes downward from a short side portion of the rectangular top surface portion,
   the short side protrusion portion has a protrusion amount smaller than that of the long side protrusion portion, and a portion of a lead wire extending from a short side of the coil is disposed below the short side protrusion portion.

2. The vibration motor according to claim 1,
wherein an adhesive covering a portion of the lead wire is disposed below the short side protrusion portion.

3. The vibration motor according to claim 1,
wherein a solder fixing portion which causes a portion of the lead wire to be fixed to the substrate is disposed below the short side protrusion portion.

4. The vibration motor according to claim 1,
wherein a penetration hole which penetrates in a vertical direction is provided in a surface of the back yoke to which the magnet is fixed.

5. The vibration motor according to claim 1,
wherein the elastic member includes
a first extension portion which extends in a first direction orthogonal to the vertical direction,
a second extension portion which extends in the first direction,
a first connection portion which connects one end portion of the first extension portion and one end portion of the second extension portion to each other,
a second connection portion which connects another end portion of the first extension portion and another end portion of the second extension portion to each other,
a third extension portion which extends in the first direction and faces the first extension portion in a second direction,
a fourth extension portion which extends in the first direction,
a third connection portion which connects one end portion of the third extension portion and one end portion of the fourth extension portion to each other,
a fourth connection portion which connects the another end portion of the third extension portion and the another end portion of the fourth extension portion to each other, and
a fifth connection portion which connects a center portion of the first extension portion and a center portion of the third extension portion to each other in the second direction orthogonal to the vertical direction and the first direction.

6. The vibration motor according to claim 5,
wherein the first extension portion is inclined upward from a center portion of the vibration motor toward both the end portions thereof,
the second extension portion is inclined upward from both the end portions toward the center portion of the vibration motor,
the third extension portion is inclined upward from the center portion of the vibration motor to both the end portions thereof, and
the fourth extension portion is inclined upward from both the end portions toward the center portion of the vibration motor.

7. The vibration motor according to claim 5,
wherein the first extension portion is inclined downward from a center portion of the vibration motor toward both the end portions thereof,
the second extension portion is inclined downward from both the end portions toward the center portion of the vibration motor,
the third extension portion is inclined downward from the center portion of the vibration motor toward both the end portions thereof, and
the fourth extension portion is inclined downward from both the end portions toward the center portion of the vibration motor.

8. The vibration motor according to claim 5,
wherein widths of the first to fourth connection portions are larger than widths of the first to fourth extension portions.

9. The vibration motor according to claim 5,
wherein at least one damper member is disposed in a region surrounded by the first extension portion, the second extension portion, the first connection portion, and the second connection portion, and
wherein at least one damper member is disposed in a region surrounded by the third extension portion, the fourth extension portion, the third connection portion, and the fourth connection portion.

10. The vibration motor according to claim 5,
wherein at least one damper member is disposed in a region interposed between the first extension portion and the third extension portion.

11. The vibration motor according to claim 1,
wherein at least one damper member is disposed in an area occupied by the elastic member in a top view.

12. The vibration motor according to claim 1,
wherein the substrate has a penetration region which penetrates vertically therethrough at least on an inner peripheral side of the coil.

13. The vibration motor according to claim 12,
wherein a plurality of notch portions are provided at an edge portion of the penetration region.

14. The vibration motor according to claim 12,
wherein a closed path pattern is provided along a periphery of the penetration region.

15. The vibration motor according to claim 12,
wherein two hole portions which have different shapes from each other and penetrate in the vertical direction are provided in a region inside a penetration region of the base plate.

16. The vibration motor according to claim 1,
wherein the long side portion extends in a first direction orthogonal to the vertical direction, and the short side portion extends in a second direction orthogonal to the vertical direction and the first direction,
a recessed notch portion is provided in each of side portions of the base plate that face each other in the second direction,
the case has side surface portions that face each other in the second direction,
each of the side surface portions has a projection portion which protrudes downward, and
the projection portions of each of the side surface portions are fitted into the recessed notch portions of each of the side surface portions.

* * * * *